April 5, 1966

R. NICAISE 3,244,511

ELECTROTHERMAL REDUCTION OF OXIDE ORES OR OTHER
OXIDE COMPOUNDS
Filed Jan. 21, 1963

*INVENTOR*
ROBERT NICAISE

BY *Hugo G. Weisberger*

ATTORNEY 3,244,511
ELECTROTHERMAL REDUCTION OF OXIDE ORES OR OTHER OXIDE COMPOUNDS
Robert Nicaise, Neerpelt, Belgium, assignor to Compagnie des Métaux d'Overpelt-Lommel et de Corphalie, Overpelt-lez-Neerpelt, Belgium, a Belgian body corporate
Filed Jan. 21, 1963, Ser. No. 252,947
4 Claims. (Cl. 75—87)

This invention relates to the reduction of oxide ores or other oxide compounds by means of heat energy of electric origin. The invention is particularly well adapted to the reduction of oxide ores of zinc and lead.

Furnaces for electrothermal reduction are known in which the charge to be reduced acts as an electric resistance, and in which a fusion of the residues from the reduction operation is avoided.

Such furnaces have numerous drawbacks, namely:

as the residues must not be fused or molten, a comparatively low temperature of reduction is required; therefore, the speed of reaction is comparatively low, and the furnaces must be of large capacity; moreover, the residues often contain appreciable amounts of metal in a non-reduced state.

It is often necessary, in order to facilitate a reduction without fusion, to improve the physical characteristics of the charge by subjecting the latter to a costly preliminary treatment.

It is also known to use for heating the charge, the heat of an electric arc. In this case, the residues are molten but various difficulties for carrying out the treatment are met with, due for instance to the very high temperatures prevalent in the neighborhood of the electric arc.

The present invention consists in a process for the reduction of oxide ores or other oxide compounds by means of heat produced wholly or in part by electric energy, and in which the charge subjected to reduction acts as a resistor, in which an electric current produces the heat by Joule effect, characterized in that the non-gaseous products from the reduction are subjected to a temperature which is sufficient to liquefy them, and the liquid thus obtained is removed as the reduction operation proceeds, from the enclosure in which the heating current is caused to pass.

Preferably, the electric current is caused to flow in an approximately horizontal direction.

The charge subjected to the reduction operation is advantageously adapted to rest upon a layer of material in grain or fragmented form, allowing the liquid products obtained from the reduction operation to flow away by gravity through the said layer.

The layer of grains or fragments upon which the charge rests may consist of a material which is more conductive of electricity than the charge itself.

The invention also consists in a furnace for the reduction of oxide ores or other oxide compounds, in which the heat required is supplied wholly or in part by electric energy, and which comprises a vessel containing the charge and walled by a refractory material, in which electrodes are arranged so that the charge subjected to the reduction operation acts as a resistor in which an electric current produced by Joule effect supplies the required heat, characterized in that the said vessel is provided at its lower part with means allowing the liquid products from the reduction operation to flow by gravity out of the vessel as the reducing operation proceeds.

The electrodes are preferably arranged to allow the electric current to pass through the charge in a substantially horizontal direction.

Advantageously, the electrodes are made of carbon, preferably in the form of graphite.

Other characteristic features of the present invention will appear from the description which follows taken in conjunction with the accompanying drawings.

Among the advantages of the present invention the following may be cited:

when non-gaseous residues from the reduction operation are allowed to fuse or melt, it is possible to effect the reduction at a high temperature, therefore, with a high speed of reaction and in a comparatively limited space;

if the liquefied residues are removed as the reducing operation proceeds, they do not exert a harmful influence upon the mechanical stability of the charge, or on the value of the current characteristics at each point of the charge:

as the heat is generated inside the charge which absorbs it "in situ" because of the endothermic nature of the reactions to which it is subjected, the drawback of uncontrollable temperature or irregular and often too high temperatures, in the neighbourhood of the electrodes of the furnaces heated by an electric arc, is avoided.

One mode of carrying the invention into effect, given by way of example only and not restrictive of the scope of the invention, will be described hereinafter with reference to the accompanying drawings.

Figure 1:
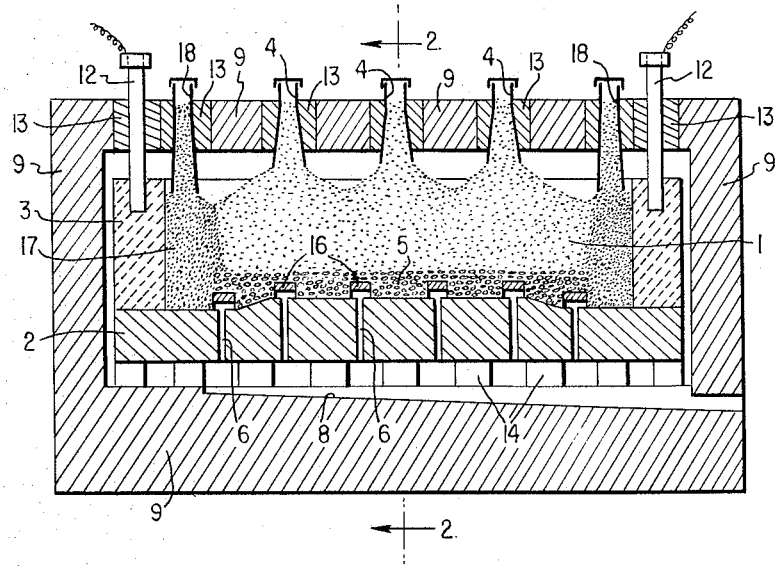
FIGURE 1 is a longitudinal section through a furnace more particularly adapted to reduction of zinciferous oxide charges.

Referring to FIGURE 1, the furnace has an outer shape of a parallelepiped. It has heat-insulated walls 9. The charge is placed inside a space 2 formed by a trough which is closed at its ends (see FIGURE 1) by means of graphite electrodes 3 which are connected to the network by means of graphite bars 12.

The electrodes 3 serve for the inlet and outlet of the electric current which passes through the charge; the latter acts as a resistor in which the heat is generated by Joule effect.

The electrodes 3 are protected against the oxidizing and corrosive action of the charge, by a layer 17 of grains of graphite, coke or other conductive material which are introduced through passages 18 passing through the roof of the furnace and provided with a gastight closing device.

The charge to be reduced is admitted through conical passages 4 provided at their upper part with a gastight closing device.

In the particular case which has been illustrated, the charge rests upon a layer of elements 5 in grain form or in the form of fragments. Such an arrangement is not essential; it facilitates however a flow in a downward direction of liquefied residues from the reduction operation. If the layer 5 consists of a material which is a better conductor of electricity than the charge itself, then it will serve itself as the preferential passage for the current and is heated more than the charge itself, thus facilitating the fusion of the residues and their flow in a downward direction.

Such a flow from the reaction chamber takes place through slits 6 shown in FIGURE 1. Bridges 16 made of refractory material prevent the non-fused materials from being removed together with the liquid residues.

The liquid residues fall through the slits 6 into a channel 8 arranged underneath the masonry forming the bottom of the trough 2.

The channel 8 which is slightly inclined towards one or the other end of the furnace, leads the liquid residues towards a pocket (not shown) outside the furnace. The said pocket serves to decant any slag and metal contained in the liquid residues. If necessary, such a pocket may be formed as an arc furnace, such as widely employed in iron metallurgy, and may serve for the refining of the cast-iron which is normally formed from the iron present in most zinc ores.

In order to facilitate at the start the bringing of the furnace to the temperature of normal operation, and to maintain during normal operation the lower part of the furnace at a temperature such that the residues flowing at 6 shall remain fully liquid, channels 7 are provided in the masonry of the furnace, containing a heating device.

Such a device may for instance be a resistor of petroleum coke.

Figure 2:
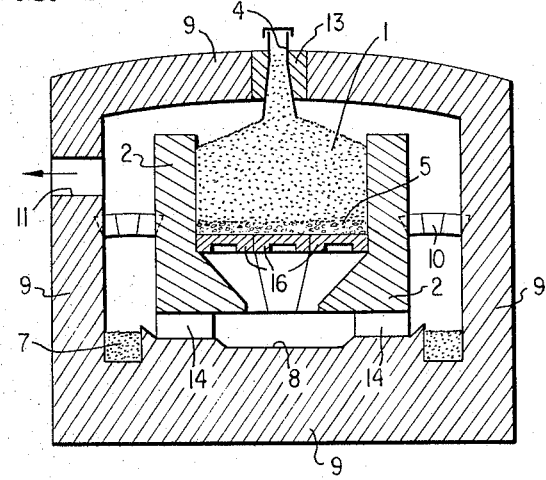
FIGURE 2 is a cross-section of the same furnace along a transverse vertical plane of line 2—2 in FIGURE 1.

FIGURE 2 shows a charge 1 to be reduced in a trough 2 walled by refractory materials of high electrical resistance.

FIGURE 2 shows wedge pieces 10 which may extend along the entire length of the furnace or which may cover part only of the channels 7. Their function is to limit the transmission of heat from the channels 7 maintained at a high temperature to the upper part of the furnace containing the gases (gaseous CO and Zn) produced by the reduction operation. Such gases rise through the charge according as the reduction operation proceeds, rise to the upper part of the furnace and leave the latter through an opening 11 into a condenser (not shown), in which the gaseous zinc is condensed to liquid state.

Practice has shown that after a certain duration of the operation the masonry 9 forming the walls of the furnace may become impregnated with substances which increase its electric conductivity. It should however preferably be avoided that the charge-resistor shall be placed electrically in parallel with a masonry which may become slightly conductive and with that object in view the trough 2 containing the charge is nowhere placed in direct contact with the walls of the furnace, but only through the intermediary of supporting blocks made of a solid refractory mass 14 or through the wedge blocks 10 which, under the operating conditions, do not become good conductors of electricity.

Lastly, the graphite bars 12 and the tubes 4 and 18 are electrically insulated from the masonry 9 by means of insulating sheathings 13.

It is to be understood that the mode of carrying the invention into effect which has been illustrated is not restrictive of the scope of the invention. The invention is not limited to the reduction of charges of zinc or lead ores.

The channel 8 may be arranged to serve for the accumulation of the liquid products, which would then be withdrawn from the furnace in a discontinuous manner.

In FIGURE 1 a monophase furnace has been shown. However a three-phase furnace may be used, comprising three monophase elements arranged in triangle or in star formation or in a straight line.

Instead of the electrodes above described, use may be made of any other means capable of leading the current into the charge.

Figure 3:
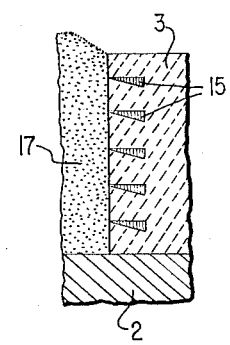
FIGURE 3 shows a detail.

Instead of the arrangement shown in FIGURE 3, use may be made of electrodes with horizontal current inlets.

FIGURE 3 shows inserts 15 of refractory bricks made in one face of the electrodes 3 with a view to reducing the erosion of the graphite.

What I claim is:

1. Method for the continuous production of zinc metal vapor from oxidized zinc compounds by means of a carbonaceous reducing agent comprising the steps of:
    (a) introducing a charge consisting essentially of an oxidized zinc compound and a carbonaceous reducing agent into an enclosed reducing zone;
    (b) applying to said charge acting as a resistor an electric current having an intensity sufficient to furnish by Joule effect the heat required for the reduction operation by which zinc metal is obtained in the vapor state and to liquefy completely the non-volatile materials resulting from the reduction operation; and
    (c) constantly avoiding an accumulation of liquefied residues in the form of a liquid bath upon which the charge would float by draining by gravity said liquefied residues from the as yet unliquefied remainder of the charge.

2. The process of claim 1 in which the charge subjected to reduction rests upon a layer of material in fragmented form which is better conductive of electricity than the charge itself, and from which said liquefied residues are drained by gravity.

3. In a furnace for the continuous production of zinc metal vapor from oxidized zinc compounds by means of a carbonaceous reducing agent, said furnace comprising an enclosed vessel for holding a charge of material to be reduced, means for continuously introducing material to be reduced into said vessel, means for applying to said charge, acting as a resistor, an electric current having an intensity sufficient to furnish by Joule effect the heat required for the reduction operation by which zinc metal is obtained in the vapor state and to liquefy completely the non-volatile materials resulting from the reduction operation, and means for recovery of gaseous reduction products, the improvement which comprises exit means located in the bottom of said vessel for constantly avoiding an accumulation of liquefied residues in the form of a liquid bath upon which the charge would float by draining by gravity said liquefied residues from the as yet unliquefied remainder of the charge, and means associated with said exit means for preventing solid material from being removed with said liquefied residues.

4. A furnace for the continuous production of zinc metal vapor from oxidized zinc compounds by means of a carbonaceous reducing agent, comprising:
    (a) an outer enclosure provided with walls, a top portion having means for continuously introducing a charge of material to be reduced and a bottom portion provided with means for withdrawing liquefied reduction products;
    (b) a reduction vessel located within said enclosure having a bottom portion supported on the bottom portion of said enclosure by electrically non-conducting refractory members, the walls of said reduction vessel being maintained in spaced relationship away from the walls of said enclosure by electrically non-conducting wedge members;
    (c) at least one pair of electrodes included in the wall portion of said reduction vessel for applying an electric current to the material to be reduced;
    (d) means located in said outer enclosure for the recovery of gaseous reduction products; and
    (e) exit means located in the bottom of said reduction vessel for constantly avoiding an accumulation of liquefied residues in the form of a liquid bath upon which the charge would float by draining by gravity said liquefied residues from the as yet unliquefied remainder of the charge, and means associated with said exit means for preventing solid material from being removed with said liquified residues.

References Cited by the Examiner

UNITED STATES PATENTS

| | | | |
|---|---|---|---|
| 614,930 | 11/1898 | Burton | 13—23 |
| 688,364 | 12/1901 | Taylor | 13—23 |
| 702,117 | 6/1902 | Taylor | 13—23 |

(Other references on following page)

UNITED STATES PATENTS

| | | | |
|---|---|---|---|
| 988,936 | 4/1911 | Hering | 13—23 |
| 1,669,406 | 5/1928 | Anderson | 75—86 |
| 2,207,779 | 7/1940 | Breyer | 75—86 |
| 2,509,326 | 5/1950 | Weaton | 75—86 |
| 2,680,144 | 6/1954 | Wilkins et al. | 75—86 X |

FOREIGN PATENTS 19,973   4/1912   Great Britain.

DAVID L. RECK, *Primary Examiner.*

H. W. CUMMINGS, H. W. TARRING,
*Assistant Examiners.*